United States Patent
Vallart et al.

(10) Patent No.: US 9,915,954 B2
(45) Date of Patent: Mar. 13, 2018

(54) ROTORCRAFT CONTROL SYSTEM, ASSOCIATED ROTORCRAFT, AND CORRESPONDING CONTROL METHOD

(71) Applicant: AIRBUS HELICOPTERS, Marignane (FR)

(72) Inventors: Jean-Baptiste Vallart, Aix en Provence (FR); Romeo Byzery, Marseilles (FR)

(73) Assignee: Airbus Helicopters, Marignane (FR)

( * ) Notice: Subject to any disclaimer, the term of this patent is extended or adjusted under 35 U.S.C. 154(b) by 17 days.

(21) Appl. No.: 15/146,108

(22) Filed: May 4, 2016

(65) Prior Publication Data

US 2016/0327958 A1   Nov. 10, 2016

(30) Foreign Application Priority Data

May 4, 2015 (FR) ..................... 15 00921

(51) Int. Cl.
*G06G 7/76* (2006.01)
*G06F 19/00* (2011.01)
(Continued)

(52) U.S. Cl.
CPC .......... *G05D 1/0816* (2013.01); *B64C 13/16* (2013.01); *G05D 1/0676* (2013.01); *G05D 1/0858* (2013.01)

(58) Field of Classification Search
CPC ........ B64C 2025/325; B64C 2201/042; B64C 2201/127; B64C 2201/088; B64C 2025/345; B64C 25/36; B64C 25/426; B64C 2201/104; B64C 15/02; G05D 1/0607; G05D 1/0684; G05D 1/0653; G05D 1/0669; G05D 1/0833; G05D 1/0005; G05D 1/0083; G05D 1/0661; B60C 23/0457;
(Continued)

(56) References Cited

U.S. PATENT DOCUMENTS 3,346,969 A    10/1967  Marvin
5,446,666 A     8/1995  Bauer
(Continued)

FOREIGN PATENT DOCUMENTS

EP    2672357     12/2013
FR    2986322      8/2013
WO    2008108787   9/2008

OTHER PUBLICATIONS

French Search Report for French Application No. FR 1500921, Completed by the French Patent Office on Mar. 15, 2016, 8 Pages.
(Continued)

*Primary Examiner* — Jelani A Smith
*Assistant Examiner* — Luis A Martinez Borrero
(74) *Attorney, Agent, or Firm* — Brooks Kushman P.C.

(57) ABSTRACT

A control system for a rotorcraft, which system includes at least one control unit allowing a rotor of a rotorcraft to be driven, with the rotorcraft including at least three independent landing-gear units, with each landing-gear unit including means for detecting a ground reaction force F1, F2, F3 exerted on the landing-gear unit when the rotorcraft is in contact with the ground, and with the control system being suitable for receiving information from the detection means. The invention also relates to the rotorcraft and to a control method corresponding to the control system.

11 Claims, 2 Drawing Sheets

(51) Int. Cl.
  *G05D 1/08* (2006.01)
  *G05D 1/06* (2006.01)
  *B64C 13/16* (2006.01)

(58) Field of Classification Search
  CPC ............ B60C 23/0459; B60C 23/0474; B60C 23/0486
  USPC ........... 701/3, 16, 100, 1, 14, 17, 18, 2, 300
  See application file for complete search history.

(56) References Cited

U.S. PATENT DOCUMENTS

| | | | | |
|---|---|---|---|---|
| 6,043,759 | A * | 3/2000 | Paterson | G01O 5/005 340/946 |
| 9,097,573 | B2 * | 8/2015 | Dubois | G01G 19/07 |
| 9,354,635 | B2 * | 5/2016 | Shue | G05D 1/0653 |
| 9,446,843 | B2 * | 9/2016 | Perlman | B64C 27/72 |
| 9,487,302 | B2 * | 11/2016 | Nagashima | B64D 31/06 |
| 9,575,493 | B2 * | 2/2017 | Shue | G05D 1/0653 |
| 9,645,582 | B2 * | 5/2017 | Shue | G05D 1/105 |
| 2003/0033927 | A1 * | 2/2003 | Bryant | B64C 25/001 91/471 |
| 2009/0269199 | A1 * | 10/2009 | Rudley | B64C 27/72 416/113 |
| 2010/0022157 | A1 * | 1/2010 | Van de Rostyne | A63H 27/12 446/37 |
| 2010/0076625 | A1 * | 3/2010 | Yoeli | B60V 1/043 701/4 |
| 2010/0095788 | A1 * | 4/2010 | Mast | B64C 25/001 73/862.541 |
| 2010/0130093 | A1 * | 5/2010 | Van de Rostyne | A63H 27/12 446/37 |
| 2010/0161174 | A1 * | 6/2010 | Yates | B64D 45/00 701/16 |
| 2011/0180656 | A1 * | 7/2011 | Shue | G05D 1/0077 244/17.13 |
| 2012/0277933 | A1 * | 11/2012 | Krogh | G05D 1/0061 701/11 |
| 2013/0325221 | A1 * | 12/2013 | Shue | G05D 1/0653 701/16 |
| 2015/0148994 | A1 * | 5/2015 | Nagashima | B64D 31/06 701/3 |
| 2016/0140854 | A1 * | 5/2016 | Enns | G08G 5/0008 701/16 |
| 2016/0297519 | A1 * | 10/2016 | Vallart | B64C 13/08 |
| 2016/0304190 | A1 * | 10/2016 | Grohmann | B64C 13/46 |
| 2016/0327958 | A1 * | 11/2016 | Vallart | G05D 1/0676 |
| 2016/0349759 | A1 * | 12/2016 | Shue | G05D 1/0653 |
| 2016/0378121 | A1 * | 12/2016 | Shue | G05D 1/105 701/7 |
| 2017/0113792 | A1 * | 4/2017 | Vallart | B64C 11/34 |
| 2017/0158311 | A1 * | 6/2017 | Shue | B64C 13/04 |

OTHER PUBLICATIONS

Young-Shin Kang et al. International Conference on Control, Automation and Systems Oct. 27-30, 2010, pp. 2533-2536, XP 031836936, "Ground Test Results of Flight Control System for the Smart UAV".

* cited by examiner

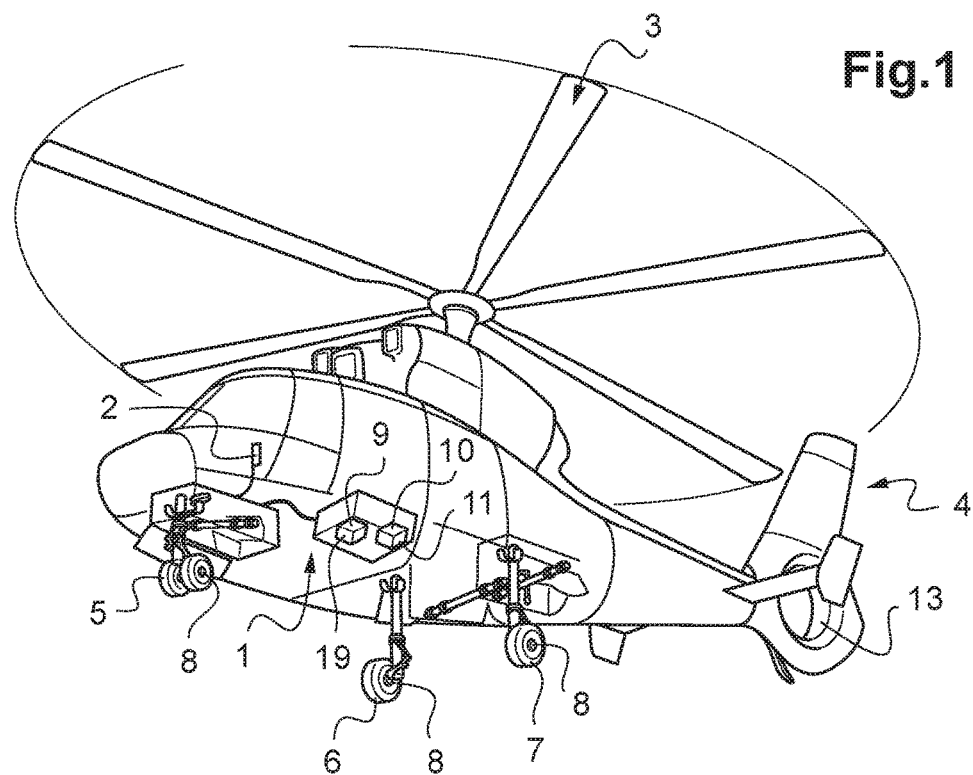
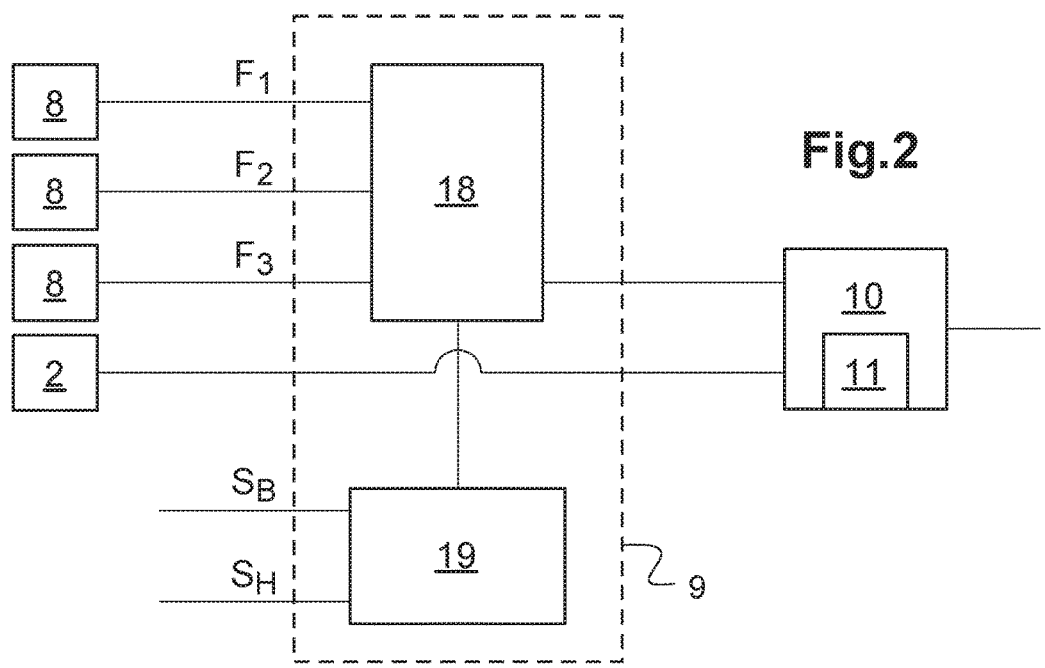

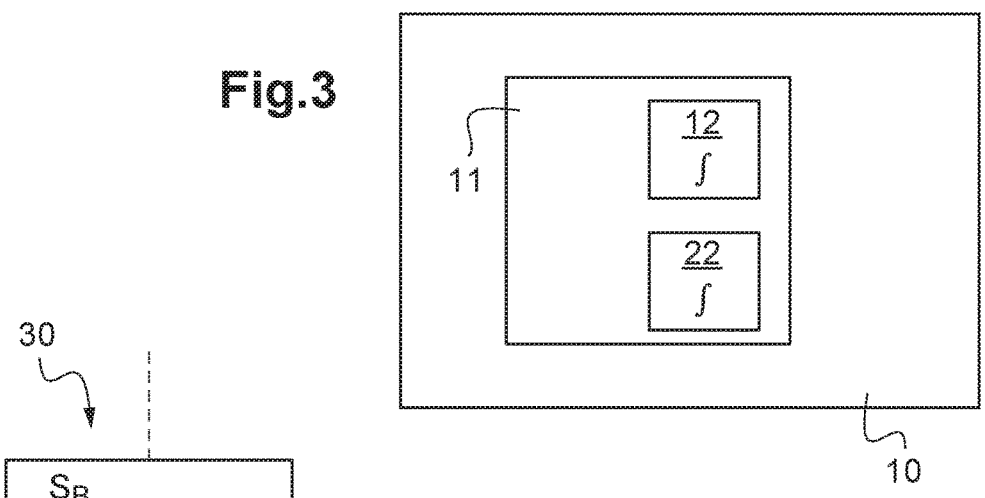
Fig.3
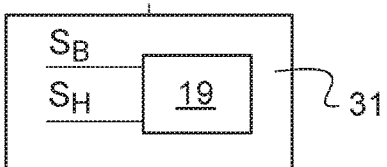
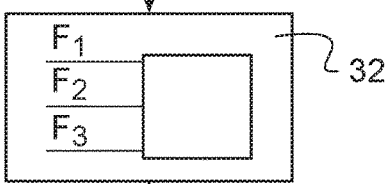
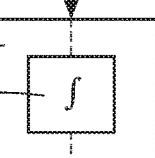 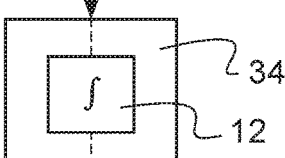
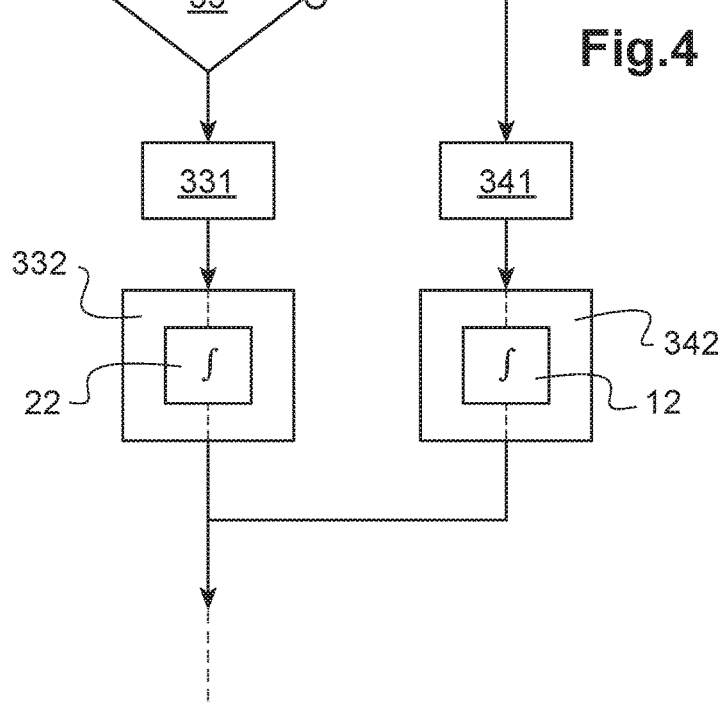
Fig.4

ROTORCRAFT CONTROL SYSTEM, ASSOCIATED ROTORCRAFT, AND CORRESPONDING CONTROL METHOD

CROSS REFERENCE TO RELATED APPLICATION

This application claims priority to French patent application No. 15 00921 filed on May 4, 2015, the disclosure of which is incorporated in its entirety by reference herein.

BACKGROUND OF THE INVENTION (1) Field of the Invention

The present invention relates to a rotorcraft control system that includes at least one control unit such as a cyclic stick, a collective pitch lever, or rudder pedals. Such a control unit makes it possible to modify the angular orientation of the blades of a rotorcraft rotor. More specifically, the collective stick and the pitch lever respectively control the collective pitch and the cyclic pitch of the blades of a main rotor of a rotorcraft, and the rudder, in particular, controls the collective pitch of the blades of an anti-torque tail rotor.

Furthermore, such a control unit is suitable for being operated either directly by a pilot or automatically, whether in a pilot cockpit or, when the rotorcraft is not carrying a pilot, from outside the rotorcraft.

(2) Description of Related Art

Accordingly, the rotor driven by the control system may be a main rotor that provides lift for the aircraft, or a tail rotor, such as an anti-torque rotor, that makes it possible to counteract the rotational yawing motion generated by a main rotor. Naturally, such a control system may also allow a main rotor and an anti-torque rotor of a rotorcraft to be driven simultaneously.

However, such a control system may also have other applications, and, in particular, may be applied to hybrid or combination rotorcraft, which are also designated by the English term "compound", and to rotorcraft having two main rotors configured in tandem or two counter-rotating main rotors.

The invention also relates to a rotorcraft equipped with such a rotor control system and a rotor control method that is implemented by means of a control unit. The invention also relates more specifically to the function consisting of adapting the control of the rotorcraft during the takeoff and landing phases.

In point of fact, depending on the mission assigned to it, a rotorcraft may be called upon to operate from extremely diverse landing sites. Accordingly, the topography of the ground or of the landing sites may be extremely varied. In particular, such sites may be sloping or tilted; elevated, such as platforms; or mobile, such as the deck of a boat.

Their surface condition or level of preparation may also differ from one site to another. Thus, the landing site may take the form of a marked concrete runway, sandy terrain, or an area of unprepared ground.

Last, the direct environment of the landing sites may be more or less rich in terms of visual markers or references for the pilot. Under certain extreme circumstances, this environment may even significantly interfere with the pilot's vision, as in the case of so-called "dust landings" (also referred to in English as "brown-outs"), or in the case of landings on snow-covered terrain (referred to in English as "white-outs").

Takeoff and landing strategies may also vary depending on the terrain and the mission. In particular, they may include purely vertical maneuvers or so-called "rolling" maneuvers.

Thus, the range of situations that the crews may face requires that the rotorcraft be equipped with a control system that is simultaneously robust, accurate, and fast during the complex phases consisting of landings and takeoffs.

These situations include, in particular, the operations that take place between flight and the fully landed state of the rotorcraft. This is typically the case when personnel such as physicians or rescue workers are disembarked on sloping terrain. This maneuver is typically performed by positioning the nose of the rotorcraft facing the rising terrain, with the forward landing gear in contact with the ground and with the rear landing gear off the ground. The individuals, who usually must climb down from or into the rotorcraft as quickly as possible, can then use the two side doors. Landings on sloping terrain are some of the most delicate maneuvers that rotorcraft crews are required to perform.

In point of fact, the control of a rotorcraft differs depending on whether the rotorcraft is in flight or in contact with the ground. Accordingly, different control laws are traditionally used to control a rotor, depending on whether the rotorcraft is or is not in contact with the ground. If the in-flight control law is retained when the rotorcraft is in contact with the ground, the preservation of the control goal would be negatively affected by this contact with the ground. The use of such a control law when the rotorcraft is in contact with the ground could, for example, cause the tilting of the rotor or even an amplification of ground resonance.

Therefore, it is customary to use a ground control law that is very different from the in-flight control law. Thus, the structure and the benefits of the ground law usually differ greatly from those of the in-flight control law. The in-flight control law favors the maintenance of flight parameters, whereas the goal of the ground control law consists of directly controlling the position of the rotor. Therefore, control of the helicopter must be adapted between these two operating modes, while maintaining a maximum level of assistance and the controllability of the aircraft during the transition phase between on-the-ground and in-flight situations. This adaptation of the control modes assumes the availability of information about the status of the aircraft in relation to the ground. This information is usually referred to collectively as the "ground/flight logic".

The control laws for a rotorcraft also generally make use of an adjuster defined by a proportional gain and an integral time constant. Accordingly, the adjuster includes an integrator that makes it possible to ensure the long-term stability of a parameter or an objective, such as an attitude of the rotorcraft or the traveling speed of the rotorcraft.

Such integrators are described, in particular, in documents EP 2 672 357 A1 and WO 2008/108787 A2, in which the integral time constant is introduced into the control law by a command from a pilot assistance system, typically referred to in English as the "trim" box. Such a box makes it easier to keep the control unit in a given position. Meanwhile, the proportional gain contributes toward the short-term stability of the parameter. Thus, such control laws are typically used to steer the rotorcraft in flight.

However, when they are activated on the ground, the proportional gains and the integral time constants can have dangerous effects, as described in paragraph [0024] of the WO 2008/108787 A2 patent, such as the tilting of the helicopter on the ground, also referred to in English as "roll-over".

In point of fact, when in contact with the ground, the rotorcraft no longer has the same degrees of freedom that it has when in flight. Consequently, the proportional gains and the integral time constants try to cancel an error that does not exist, in view of the stress applied to the rotorcraft by the ground. This residual error then causes a phenomenon known as control drift (also referred to as "swerving"), which can place the rotor in a position such that the force that it develops literally causes the rotorcraft to tilt.

Furthermore, the control laws that are appropriate for the "in flight" state of the rotorcraft usually entail a high level of proportional gain. These substantial gains are intended to ensure the stability of the rotorcraft, allowing the rejection of perturbations and a rapid response to instructions from the control unit.

Nevertheless, a high gain level leads to the appearance of a specific new risk on the ground, currently referred to as the "ground resonance" phenomenon. Pilots can train themselves to avoid this risk, for example, through the use of dedicated simulators, such as the one described in U.S. Pat. No. 3,346,969 A. The occurrence of ground resonance depends on the particular characteristics of the rotorcraft and of its control system, and on the particular nature of the landing site.

Furthermore, it is known that in order to avoid these risks, simpler control laws can be implemented, and the proportional gains of the control laws can be reduced when contact with the ground is detected.

Contact with the ground can be also identified through the use of dedicated sensors, often referred to in English as "weight-on-wheel" (WoW) or "weight-on-gear" (WoG) sensors, depending on their location on the landing gear. These sensors usually produce a discrete state, as described in document WO 2008/108787 A2, and, less commonly, a continuous state that makes it possible to define several distinct states of the landing gear, as described in document EP 2 672 357 A1.

Document EP 2 672 357 A1 also describes a simplification of the control laws when a rotorcraft is landing, by canceling the integral adjustment at the first sign of contact with the ground. Such a cancellation of the integral adjustment is referred to in this document by the use of the term "grounded" in paragraph [0068] to designate the state of the longitudinal integrating adjusters.

Such a state of the adjusters thus consists of freezing the output of the integrator, for example, by means of a null input. The integrator no longer operates, but retains the memory of the last command that was executed, thereby ensuring the continuity of the instruction sent to the servocontrols that control the rotor.

The error corresponding to the difference between the setpoint and the measurement passes through a gain control system and then through an adjuster, which includes at least one integrator, which can be placed in the so-called "grounded" state (that is, it can be rendered inoperative by means of a switch that sets its input to zero, depending on the ground/flight states).

When the integrator is rendered inoperative, the slaving of the measurement to the setpoint no longer takes place, and a static error can be stored on the adjusted control setpoint. Thus, the authority of the parameter is reduced, as is the authority of the associated command. For example, paragraph [0064] states that the control gain is reduced. Thus, the adjusted control setpoint at the output of the adjuster is immediately reduced accordingly, thereby also enabling a reduction in the control authority. For a given displacement of the control unit, the resulting command is then weaker.

Conversely, when an integral adjustment is retained via an active adjuster during this landing phase, the integrator performs an integration until the static error becomes null. Thus, the preservation of an active integrator ensures the preservation of authority. It should be noted that this is independent of the gain level. Even with a reduced control gain, the control setpoint will reach the same final level more slowly.

It should also be noted that the preservation of the authority allocated to the pilot is of primordial importance for landings on sloping terrain, during which stabilized controls are often reached near the mechanical stops of the actuators.

Thus, the present invention and document EP 2 672 357 A1 reflect major differences in implementation and in terms of their goals.

It should be noted that the present invention can easily be generalized to mechanical flight controls, which is obviously not the case with the teachings of document EP 2 672 357 A1. Accordingly, the invention is particularly well suited to automatic landings and takeoffs.

Furthermore, even if the control systems described in the prior art make it possible to guard against certain risks that are specific to missions involving rotorcraft on the ground, these control systems are not satisfactory in terms of controlling the rotorcraft.

Indeed, on the one hand, such control systems entail a significant change in rotorcraft piloting philosophy during a delicate phase of operations. For the pilot, this change in philosophy is accompanied by an additional workload, with a non-negligible risk of pilot-induced oscillation (PIO). On the other hand, such control systems are oriented toward standard landing and takeoff maneuvers rather than toward missions involving intermediate states of the rotorcraft between flight and the ground.

Accordingly, a crew performing a landing on sloping terrain may find itself without assistance during the period between touchdown and the fully landed state of the rotorcraft, in a maneuver that is still extremely delicate. Consequently, such control systems are not well suited to the disembarkation of individuals from a rotorcraft that is positioned with its nose facing the rising terrain.

BRIEF SUMMARY OF THE INVENTION

Accordingly, the goal of the present invention is to propose a rotorcraft control system, a rotorcraft equipped with such a control system, and the method for controlling the rotorcraft in such a way as to overcome the above-mentioned limitations.

This control system also makes it possible to ensure the safe and effective piloting of the rotorcraft during the disembarkation or embarkation of personnel on sloping terrain.

Consequently, the invention relates to a control system that includes at least one control unit that allows a rotorcraft rotor to be driven. Such a rotorcraft also includes at least three independent landing-gear units, with each landing-gear unit including means for detecting a ground reaction force F1, F2, F3 exerted on the landing-gear unit when the rotorcraft is in contact with the ground. The control system is thus suitable for receiving information from the detection means.

Such a control system includes:

identification means allowing the identification of a current state from among at least two different states of the rotorcraft, namely, a state of "touching" the ground and an "in flight" state, by comparing the reaction forces F1, F2, F3, as measured by the detection means, against predetermined low ($S_B$) and high ($S_H$) threshold values;

with the "touching" state being identified when the following two conditions have been confirmed:

the reaction force F1, as measured by one of the detection means, is greater than the low threshold ($S_B$) value but lower than the high threshold ($S_H$) value; and each of the reaction forces F2, F3, as measured by at least two other detection means, is lower than the low threshold ($S_B$) value; and with the "in flight" state being identified when each of the reaction forces F1, F2, F3, as measured simultaneously by the detection means, of which there are at least three, is lower than the low threshold ($S_B$) value;

control means for controlling the rotor of the rotorcraft according to at least two control laws that are separate from one another, depending on the current state of the said rotorcraft as identified by the identification means, namely:

a first control law, implemented by the control means when the current state has been identified as the "in flight" state; and a second control law, implemented by the control means when the current state has been identified as the "touching" state.

Such a control system is noteworthy in that:

the low threshold ($S_B$) value is greater than zero;

the control means include a computer that makes it possible to implement the first and second control laws by means of integrating adjusters that stay active, with the integrating adjusters enabling at least two different settings of an integral adjustment dynamic, with a first setting of the integral adjustment dynamic of the integrating adjuster corresponding to the first control law and a second setting of the integral adjustment dynamic of the integrating adjuster corresponding to the second control law, and with this second setting enabling the continuous active state of an integrated component located at the output of the integrating adjuster corresponding to the second control law; and the second control law makes it possible to maintain full control authority over the control of the rotor of the rotorcraft.

In other words, such a control system makes it possible to identify a weak, individual, and non-null load applied to one of the landing-gear units of the aircraft, and to modify almost instantaneously the control law for the rotor when this load has been identified.

The detection means that make it possible to measure the reaction forces F1, F2, F3 that are applied to the various landing-gear units may also include sensors whose purpose is to identify the displacement of a landing-gear unit. Such sensors are known, and, in particular, have been described by the present applicant in document FR 2986322.

The signals from these sensors are then transmitted to a computer and processed by ground/flight software that allows the various states of the rotorcraft to be identified. Such a distinction between the various states is made possible by the proportional nature of the information from the landing-gear sensors.

The in-flight state is defined by a lack of contact between the rotorcraft and the ground, within the limits of accuracy of the sensors. Meanwhile, the "touching" state is defined by the detection, by at least one of the landing-gear units, of a load that is between a low threshold ($S_B$) value and a high threshold ($S_H$) value.

Thus, as soon as the identification means identify a change between these two states, the control means modify the control law, allowing the rotor to be driven, in particular, by means of the integrating adjusters that have remained active while the rotorcraft is in the "touching" state. Thus, the pilot retains full control authority during this critical phase corresponding to the "touching" state of the rotorcraft.

Furthermore, the second setting of the integral adjustment dynamic of the integrating adjuster corresponding to the second control law does not freeze the integral component located at the output of the integrator.

Advantageously, the first setting of the integral adjustment dynamic of the integrating adjuster corresponding to the first control law can generate control changes that are faster than the ones obtained with the second setting of the integral adjustment dynamic of the integrating adjuster corresponding to the second control law. Thus, the second setting of the integral adjustment dynamic corresponding to the second control law does not freeze the output of the integrating adjuster.

In other words, when the "touching" state is detected, the computer for the control means makes it possible to limit the integral adjustment dynamic of the integrating adjusters, by clipping the error generated by a comparator between the control setpoint at the computer input and the control setpoint adjusted by the computer in order to control the rotor. Furthermore, the setting of the dynamic of the integrating adjusters can be performed, in particular, by adapting a control gain or by limiting the integrated signal.

Moreover, the low threshold ($S_B$) and high threshold ($S_H$) values, which make it possible to define the identification ranges for the current state of the rotorcraft, may differ from one rotorcraft to another. In point of fact, even otherwise identical rotorcraft may have specific individual load masses and piloting preferences. Finally, the low threshold ($S_B$) and high threshold ($S_H$) values depend on the type of rotorcraft, and therefore are not a priori identical for two different types of rotorcraft.

Therefore, such integrating adjusters have at least one integral component that differs between the two adjusters. Consequently, they may be of the same type (that is, they may be implemented by means of the same algorithm, some of whose calculation parameters may be modified between the two control laws). The integrating adjusters are advantageously selected from among the group including, in particular, pure integrating adjusters and so-called Proportional Integral Derivative (PID) adjusters.

In one particular embodiment, the first setting of the integral adjustment dynamic of the integrating adjuster corresponding to the first control law can generate control changes that are twice as fast as the ones obtained with the second setting of the integral adjustment dynamic of the integrating adjuster corresponding to the second control law.

Thus, in practice, the high threshold ($S_H$) value may be between 2,500 Newtons and 20,000 Newtons.

In point of fact, above this level of stress, the "touching" state of the rotorcraft is no longer detected. In this case, the identified current state corresponds to at least one landed state of the rotorcraft in which a new control law is implemented with a different structure of the first and second control laws. In particular, such a new law may be a direct or proportional law, and may not include an integrating adjuster.

Similarly, and in a particular embodiment, the low threshold ($S_B$) value may be between 1,000 Newtons and 10,000 Newtons.

In this way, as long as the force measured in one of the landing-gear units is lower than this non-null weak low threshold ($S_B$) value, the current state is identified as the "in flight" state.

As mentioned earlier, the invention also relates to a rotorcraft that includes at least one control unit that allows a rotorcraft rotor to be driven. Such a rotorcraft also includes at least three independent landing-gear units, with each landing-gear unit including means for detecting a ground reaction force F1, F2, F3 exerted on the landing-gear unit when the rotorcraft is in contact with the ground.

This rotorcraft is noteworthy in that it includes a control system such as the one described hereinabove.

The invention also relates to a method for controlling a rotorcraft by means of at least one control unit that allows a rotorcraft rotor to be driven. This rotorcraft includes at least three independent landing-gear units, with each landing-gear unit including means for detecting a ground reaction force F1, F2, F3 exerted on the landing-gear unit when the rotorcraft is in contact with the ground.

Such a control method includes stages consisting of:
storing, in memory, predetermined low ($S_B$) and high ($S_H$) threshold values;
measuring the ground reaction forces F1, F2, F3 on each landing-gear unit;
comparing the reaction forces F1, F2, F3 against the said predetermined low ($S_B$) and high ($S_H$) threshold values;
identifying a current state from among at least two different states of the rotorcraft, namely, a state of "touching" the ground and an "in flight" state;
with the "touching" state being identified when the following two conditions have been confirmed:
the reaction force F1, as measured by one of the detection means, is greater than the low threshold ($S_B$) value but lower than the high threshold ($S_H$) value; and
each of the reaction forces F2, F3, as measured by at least two other detection means, is lower than the low threshold ($S_B$) value; and
with the "in flight" state being identified when each of the reaction forces F1, F2, F3, as measured simultaneously by the detection means, of which there are at least three, is lower than the low threshold ($S_B$) value;
controlling the rotor of the rotorcraft according to at least two control laws that are separate from one another, depending on the identified current state of the rotorcraft;
a first control law, implemented when the current state has been identified as the "in flight" state; and
a second control law, implemented when the current state has been identified as the "touching" state;

Such a method is noteworthy in that:
the low threshold ($S_B$) value is greater than zero;
the first and second control laws are implemented by means of integrating adjusters that stay active, with the integrating adjusters enabling at least two different settings of an integral adjustment dynamic, with a first setting of the integral adjustment dynamic of the integrating adjuster corresponding to the first control law and a second setting of the integral adjustment dynamic of the integrating adjuster corresponding to the second control law, and with the second setting enabling the continuous active state of an integrated component located at the output of the integrating adjuster corresponding to the second control law; and
the second control law makes it possible to maintain full control authority over the control of the rotor of the rotorcraft.

Thus, such a control method makes it possible to modify the control law of the rotor of a rotorcraft as soon as a non-null load is measured on one of the landing-gear units. Such a load that is independent of one of the landing-gear units is identified, in particular, when the rotorcraft lands on sloping terrain.

As mentioned earlier, the stage consisting of controlling the rotor is implemented through control means and, more specifically, through the use of a computer that is suitable for receiving the steering setpoints transmitted by the pilot to at least one steering unit. The computer then generates the control laws for the rotor, based on the stresses measured in the landing-gear units, of which there are at least three.

In one particular embodiment, the first setting of the integral adjustment dynamic of the integrating adjuster corresponding to the first control law can be selected so as to generate control changes that are faster than the ones obtained with the second setting of the integral adjustment dynamic of the integrating adjuster corresponding to the second control law. Furthermore, the setting of the integral adjustment dynamic for the second control law does not correspond to a freeze of the output of the integrating adjuster.

In this way, such a control method makes it possible to limit the dynamic of the control system as soon as the current state has been identified as a state of contact with the ground. The limitation of the error signal then leads to the clipping of the error signal issued by a comparator between the control setpoint and the return or feedback of the measured signal.

BRIEF DESCRIPTION OF THE SEVERAL VIEWS OF THE DRAWINGS

The invention and its advantages will become clear in greater detail within the scope of the following description, which includes illustrative examples with reference to the attached figures, among which:

FIG. 1 is a perspective view of a rotorcraft according to the invention;

FIG. 2 is a functional diagram of a control system according to the invention;

FIG. 3 is a diagram illustrating certain control means according to the invention; and FIG. 4 is a schematic diagram of the control method according to the invention.

DETAILED DESCRIPTION OF THE INVENTION

As mentioned earlier, the invention relates to a rotorcraft control system, a control method, and an associated rotorcraft.

As shown in FIG. 1, the rotorcraft 4 is equipped with a control system 1 that includes a control unit 2 that allows the rotor or rotors 3, 13 of the rotorcraft 4 to be driven. The rotor 3 is a lifting rotor or a propulsion rotor for the rotorcraft 4, and the rotor 13 is a tail rotor that has an anti-torque function and is intended to guide this rotorcraft.

Such a rotorcraft 4 is also equipped with at least three landing-gear units 5, 6, 7, and each of these landing-gear units 5, 6, 7 includes detection means 8, such as sensors that are suitable for measuring a relative displacement in a landing-gear unit 5, 6, 7. The signals from these detection means 8 are transmitted to the control system 1 in which the identification means 9 analyze them and compare them against at least one low threshold ($S_B$) value and at least one high threshold ($S_H$) value.

Such identification means 9 also include, in particular, a memory unit 19 for storing, at least temporarily, the low threshold ($S_B$) values and the high threshold ($S_H$) values, and analysis means, such as, for example, a computer or a microprocessor.

The control system 1 is also connected to a control unit 2 that is operated by the pilot of the rotorcraft 4. Thus, depending on the ground reaction forces F1, F2, F3 measured by the various detection means 8, the control system 1 generates and modifies control laws for the rotor or rotors 3, 13.

In accordance with the control method according to the invention, the identification means 9 make it possible, in particular, to identify a current state of the rotorcraft 4, distinguishing between a state "touching" the ground and an "in flight" state. The "touching" state is identified when the following two conditions have been confirmed:

the reaction force F1, as measured by one of the detection means 8, is greater than the low threshold ($S_B$) value but lower than the high threshold ($S_H$) value; and each of the reaction forces F2, F3, as measured by at least two other detection means 8, is lower than the low threshold ($S_B$) value.

Meanwhile, the "in flight" state is identified when each of the reaction forces F1, F2, F3, as measured simultaneously by the detection means 8, of which there are at least three, is lower than the low threshold ($S_B$) value.

Moreover, the control system 1 also includes control means 10 that are capable of generating different control laws for each identified state of the rotorcraft 4. Accordingly, such control means 10 typically include a computer 11 that is capable of implementing the different control laws of the control system 1.

As shown in FIG. 2, the identification means 9 may include an analytical unit 18, such as a computer or a microprocessor that receives the signals from the detection means 8 that represent the reaction forces F1, F2, and F3 between the landing-gear units 5, 6, 7 and the ground. Furthermore, the low threshold ($S_B$) and high threshold ($S_H$) values, as recorded in the memory unit 19 of the identification means 9, are intended to be compared against the reaction forces F1, F2, F3.

Once the comparison has been made by the analytical unit 18, the current state is identified and then transmitted to the control means 10 that include a computer 11, so that one of the different control laws for the rotor 3, 13 can be generated. Thus, the control means 10 also receive a control setpoint generated by the control unit 2, allowing, as an output, the driving of the servocontrols of the actuators of the rotors 3, 13 of such a rotorcraft 4.

Furthermore, the control means 10 make it possible to control the rotor 3, 13 of the rotorcraft 4 (or, more accurately, the servocontrols of the actuators of the rotor 3, 13), according to at least two control laws that are separate from one another, depending on the current state of the rotorcraft 4 as identified by the identification means 9. These two control laws are advantageously generated by a single computer or, alternatively, by a single calculation algorithm in which parameters suitable for each state of the rotorcraft are modified.

Furthermore, according to another example of an embodiment, the two control laws may also be implemented in parallel via two separate computers and two different calculation algorithms, whose a structure may nevertheless be identical.

In the two scenarios described hereinabove, a first control law is implemented by the control means 10 when the current state of the rotorcraft 4 is identified as the "in flight" state, and a second control law is implemented by the control means 10 when the current state of the rotorcraft 4 is identified as the "touching" state.

As shown in FIG. 3, the control means 10 may include a computer 11 that includes integrating adjusters 12, 22 that are suitable for implementing the first and second control laws for the servocontrols of the actuators of the rotors 3, 13 of such a rotorcraft 4. As mentioned earlier hereinabove, such a logical representation of two different integrating adjusters may, in practice, be implemented by means of a single algorithm, some of whose calculation parameters are modified successively. They may even be implemented in alternation and/or in parallel by means of two different calculation algorithms. Moreover, the dynamic of the integrator of the first control law implemented by the integrator 12 is advantageously chosen to be faster than the dynamic of the integrator of the second control law implemented by the integrator 22.

Such integrating adjusters 12, 22 have at least one integral component. Thus, the integrating adjusters 12, 22 may be of different types, and are selected, in particular, from among the group including, in particular, pure integrating adjusters and so-called Proportional Integral Derivative (PID) adjusters.

The integrator 22 may advantageously make it possible to achieve a limitation of the dynamic of the rotorcraft 4. Furthermore, such a limitation may be calculated so as to make the potential swerving of the control unit more easily controllable by a human pilot. Accordingly, the speed of the automatic steering control may advantageously be chosen so as to be lower than the control speed that may be obtained by a pilot through control units such as the collective stick, the cyclic lever, or the rudder.

Furthermore, the control speed of the rotor 3, 13 may be made dependent on the level of the angular speed of the rotorcraft 4 along a given axis. Thus, for very low angular speeds of displacement of the control unit, which are characteristic of a very gradual landing, the speed of the control of the rotor 3, 13 is very limited. In particular, in the case of locking of the rotorcraft 4 that might lead to swerving of the control units 2, the angular speed of the rotorcraft 4 may be made residual, thereby preventing the swerving of the control unit 2. Conversely, in the event of a high angular speed of the rotorcraft 4 (for example, during a slide following a landing on sloping terrain), the control law may possess sufficient dynamics to counteract the trajectory deviation of the rotorcraft 4.

As mentioned earlier and as shown in FIG. 4, the invention also relates to a rotorcraft control method, which method includes several successive stages 31, 32, 33. Thus, according to this method, at least one control unit 2 makes it possible to drive a rotor 3, 13 of the said rotorcraft 4. Such a rotorcraft 4 also includes at least three independent landing-gear units 5, 6, 7, with each landing-gear unit 5, 6, 7 including means 8 for detecting a ground reaction force F1, F2, F3 exerted on the landing-gear unit 5, 6, 7 when the rotorcraft 4 is in contact with the ground.

Thus, such a control method 30 includes a first stage 31 that consists of storing, in a memory unit 19, predetermined low ($S_B$) and high ($S_H$) threshold values. Next, thanks to the detection means 8, a second stage 32 consists of measuring the forces F1, F2, F3.

A third stage 33 of the control method 30 then consists of performing the comparison between the forces F1, F2, F3, as measured, and the predetermined low ($S_B$) and high ($S_H$) threshold values stored in the memory unit 19.

After the comparison stage 33 has been completed, a current state is identified from among at least two separate states of the rotorcraft 4. The identification of a state "touching" the ground is performed during stage 331, and, alternatively, the identification of an "in flight" state is performed during stage 341.

As indicated earlier for the system 1, the "touching" state of the rotorcraft is identified during stage 331 when the following two conditions have been confirmed during the comparison stage 33:

the reaction force F1, as measured by one of the detection means 8, is greater than the low threshold ($S_B$) value but lower than the high threshold ($S_H$) value; and each of the reaction forces F2, F3, as measured by at least two other detection means 8, is lower than the low threshold ($S_B$) value.

Meanwhile, the "in flight" state of the rotorcraft is identified during stage 341 when, during the comparison stage 33, each of the reaction forces F1, F2, F3, as measured simultaneously by the detection means 8, of which there are at least three, is lower than the low threshold ($S_B$) value.

After one of these identification stages 331, 341 has been completed, the control method shifts to a stage 332, 342 consisting of controlling the rotor 3, 13 of the rotorcraft 4 in accordance with a control law selected from among at least two control laws that are separate from one another, depending on the current state of the rotorcraft 4 as identified during stage 331 or stage 341.

Thus, in stage 342, a first control law is implemented when the current state is identified as the "in flight" state of the rotorcraft, and in stage 332 a second control law is implemented when the current state is identified as the "touching" state of the rotorcraft.

Furthermore, during stage 342, the first control law is implemented by means of an integrating adjuster 12. Similarly, during stage 332, the second control law is implemented by means of an integrating adjuster 22. As mentioned earlier, these first and second control laws are implemented by control means 10 that include at least one computer 11. More advantageously, the integrating adjuster 12 that is implemented by the computer 11 may be selected such that it includes a first integration interval that is greater than a second integration interval corresponding to the integrating adjuster 22 that implements the second law.

Moreover, likewise as mentioned earlier, the integrating adjusters 12, 22 may be selected as pure integrators or else as PID adjusters that include, in particular, an integral component.

Based on the foregoing discussion, it is clear that a control system, an associated rotorcraft, and a method for controlling a rotor of a rotorcraft offer numerous advantages, including, in particular:

the ability to facilitate the operations consisting of landing and of embarking persons on sloping terrain;

a guaranteed optimal safety level for controlling a rotorcraft, by reducing the risks of ground resonance, swerving of the control units, and/or tilting of the rotorcraft; and a more gradual transition from the in-flight control laws to the ground control laws, without involving any integrators or feedback in order to avoid the risks of swerving and ground resonance.

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

What is claimed is:

1. A control system, which system includes at least one control unit allowing a rotor of a rotorcraft to be driven, with the rotorcraft including at least three independent landing-gear units, with each landing-gear unit including means for detecting a ground reaction force F1, F2, F3 exerted on the landing-gear unit when the rotorcraft is in contact with the ground, and with the control system being suitable for receiving information from the detection means, the control system comprising:

identification means allowing the identification of a current state of the rotorcraft from among at least two different states of the rotorcraft, namely, a state of "touching" the ground and an "in flight" state, by comparing the ground reaction forces F1, F2, F3, as measured by the detection means, against predetermined low ($S_B$) and high ($S_H$) threshold values;

with the "touching" state being identified when the following two conditions have been confirmed:

the ground reaction force F1, as measured by one of the detection means, is greater than the low threshold ($S_B$) value but lower than the high threshold ($S_H$) value; and each of the ground reaction forces F2, F3, as measured by at least two other detection means, is lower than the low threshold ($S_B$) value;

and with the "in flight" state being identified when each of the ground reaction forces F1, F2, F3, as measured simultaneously by the at least three detection means, is lower than the low threshold ($S_B$) value;

control means for controlling the rotor of the rotorcraft according to at least two control laws that are separate from one another, depending on the current state of the rotorcraft as identified by the identification means, namely:

a first control law, implemented by the control means when the current state has been identified as the "in flight" state; and a second control law, implemented by the control means when the current state has been identified as the "touching" state;

with the control system being characterized in that:

the low threshold ($S_B$) value is greater than zero;

the control means include a computer allowing the implementation of the first and second control laws by means of integrating adjusters that stay active, with the integrating adjusters enabling at least two different settings of an integral adjustment dynamic, with a first setting of the integral adjustment dynamic of the integrating adjuster corresponding to the first control law and a second setting of the integral adjustment dynamic of the integrating adjuster corresponding to the second control law, and with the second setting enabling the continuous active state of an integrated component located at the output of the integrating adjuster corresponding to the second control law; and the second control law makes it possible to maintain full control authority over the control of the rotor of the rotorcraft.

2. The control system according to claim 1, wherein the first setting of the integral adjustment dynamic of the integrating adjuster corresponding to the first control law generates control changes that are faster than the ones obtained with the second setting of the integral adjustment dynamic of the integrating adjuster corresponding to the second control law.

3. The control system according to claim 1, wherein the first setting of the integral adjustment dynamic of the integrating adjuster corresponding to the first control law generates control changes that are twice as fast as the ones obtained with the second setting of the integral adjustment dynamic of the integrating adjuster corresponding to the second control law.

4. The control system according to claim 1, wherein the high threshold ($S_H$) value is between 2,500 Newtons and 20,000 Newtons.

5. The control system according to claim 1, wherein the low threshold ($S_B$) value is between 1,000 Newtons and 10,000 Newtons.

6. A rotorcraft comprising:
at least one rotor;
at least one control unit allowing the at least one rotor to be driven;
at least three independent landing-gear units, with each landing-gear unit including means for detecting a ground reaction force F1, F2, F3 exerted on the landing-gear unit when the rotorcraft is in contact with the ground; and
a control system including:
identification means allowing the identification of a current state of the rotorcraft from among at least two different states of the rotorcraft, namely, a state of "touching" the ground and an "in flight" state, by comparing the ground reaction forces F1, F2, F3, as measured by the detection means, against predetermined low ($S_B$) and high ($S_H$) threshold values;
with the "touching" state being identified when the following two conditions have been confirmed:
the ground reaction force F1, as measured by one of the detection means, is greater than the low threshold ($S_B$) value but lower than the high threshold ($S_H$) value; and
each of the ground reaction forces F2, F3, as measured by at least two other detection means, is lower than the low threshold ($S_B$) value;
and with the "in flight" state being identified when each of the ground reaction forces F1, F2, F3, as measured simultaneously by the at least three detection means, is lower than the low threshold ($S_B$) value;
control means in cooperation with the at least control unit for controlling the at least one rotor of the rotorcraft according to at least two control laws that are separate from one another, depending on the current state of the rotorcraft as identified by the identification means, namely:
a first control law, implemented by the control means when the current state has been identified as the "in flight" state; and
a second control law, implemented by the control means when the current state has been identified as the "touching" state;
with the control system being characterized in that:
the low threshold ($S_B$) value is greater than zero;
the control means include a computer allowing the implementation of the first and second control laws by means of integrating adjusters that stay active, with the integrating adjusters enabling at least two different settings of an integral adjustment dynamic, with a first setting of the integral adjustment dynamic of the integrating adjuster corresponding to the first control law and a second setting of the integral adjustment dynamic of the integrating adjuster corresponding to the second control law, and with the second setting enabling the continuous active state of an integrated component located at the output of the integrating adjuster corresponding to the second control law; and
the second control law makes it possible to maintain full control authority over the control of the at least one rotor of the rotorcraft.

7. A method for controlling a rotorcraft by means of at least one control unit allowing a rotor of the rotorcraft to be driven, the rotorcraft including at least three independent landing-gear units, with each landing-gear unit including means for detecting a ground reaction force F1, F2, F3 exerted on the landing-gear unit when the rotorcraft is in contact with the ground, the method comprising:
storing, in memory, predetermined low ($S_B$) and high ($S_B$) threshold values;
measuring the ground reaction forces F1, F2, F3 on each landing-gear unit;
comparing the ground reaction forces F1, F2, F3 against the predetermined low ($S_B$) and high ($S_H$) threshold values;
identifying a current state of the rotorcraft from among at least two different states of the rotorcraft, namely, a state of "touching" the ground and an "in flight" state;
with the "touching" state being identified when the following two conditions have been confirmed:
the ground reaction force F1, as measured by one of the detection means, is greater than the low threshold ($S_B$) value but lower than the high threshold ($S_H$) value; and
each of the ground reaction forces F2, F3, as measured by at least two other detection means (8), is lower than the low threshold ($S_B$) value; and
with the "in flight" state being identified when each of the ground reaction forces F1, F2, F3, as measured simultaneously by the at least three detection means, is lower than the low threshold ($S_B$) value;
controlling, by control means in cooperation with the at least one control unit, the rotor of the rotorcraft according to at least two control laws that are separate from one another, depending on the identified current state of the rotorcraft;
a first control law, implemented when the current state has been identified as the "in flight" state; and
a second control law, implemented when the current state has been identified as the "touching" state;
wherein the low threshold ($S_B$) value is greater than zero;
wherein the first and second control laws are implemented by means of integrating adjusters that stay active, with the integrating adjusters enabling at least two different settings of an integral adjustment dynamic, with a first setting of the integral adjustment dynamic of the integrating adjuster corresponding to the first control law and a second setting of the integral adjustment dynamic of the integrating adjuster corresponding to the second control law, and with the second setting enabling the continuous active state of an integrated component located at the output of the integrating adjuster corresponding to the second control law; and
wherein the second control law makes it possible to maintain full control authority over the control of the rotor of the rotorcraft.

8. The method according to claim 7, wherein the first setting of the integral adjustment dynamic of the integrating adjuster corresponding to the first control law is selected so as to generate control changes that are faster than the ones obtained with the second setting of the integral adjustment dynamic of the integrating adjuster corresponding to the second control law.

9. The rotorcraft of claim 6, wherein the first setting of the integral adjustment dynamic of the integrating adjuster corresponding to the first control law generates control changes that are faster than the ones obtained with the second setting of the integral adjustment dynamic of the integrating adjuster corresponding to the second control law.

10. The rotorcraft of claim 6, wherein the high threshold ($S_H$) value is between 2,500 Newtons and 20,000 Newtons.

11. The rotorcraft of claim 6, wherein the low threshold ($S_B$) value is between 1,000 Newtons and 10,000 Newtons.

* * * * *